United States Patent
Zajac

(12) 
(10) Patent No.: US 6,806,308 B2
(45) Date of Patent: Oct. 19, 2004

(54) METHOD FOR PROTECTING PAINT ON AN ARTICLE, A COMPOSITION USEFUL THEREFOR, AND A METHOD FOR MAKING THE COMPOSITION

(75) Inventor: Bohdan Zajac, Warren, MI (US)

(73) Assignee: Chemico Systems, Inc., Pontiac, MI (US)

( * ) Notice: Subject to any disclaimer, the term of this patent is extended or adjusted under 35 U.S.C. 154(b) by 133 days.

(21) Appl. No.: 09/996,467

(22) Filed: Nov. 26, 2001

(65) Prior Publication Data

US 2002/0076487 A1 Jun. 20, 2002

Related U.S. Application Data

(63) Continuation-in-part of application No. 09/508,126, filed on Mar. 6, 2000, now Pat. No. 6,391,961.

(51) Int. Cl.[7] .................. C08L 33/02; C08L 33/08; C08L 33/10; B65B 33/04
(52) U.S. Cl. .............. 524/522; 524/523; 525/191; 427/154; 427/156
(58) Field of Search ................ 524/522, 523, 524/556, 560; 427/154, 156; 525/191, 91

(56) References Cited

U.S. PATENT DOCUMENTS

| | | | | | |
|---|---|---|---|---|---|
| 5,143,949 A | * | 9/1992 | Grogan et al. | ............. | 523/334 |
| 5,453,459 A | * | 9/1995 | Roberts | ............. | 524/123 |
| 5,719,221 A | * | 2/1998 | Swidler | ............. | 524/309 |
| 5,750,269 A | * | 5/1998 | Park | ............. | 428/484.1 |
| 6,011,107 A | * | 1/2000 | Maxwell et al. | ............. | 524/566 |

\* cited by examiner

Primary Examiner—Callie Shosho
(74) Attorney, Agent, or Firm—Lynn E. Cargill

(57) ABSTRACT

A coating composition includes 1.5 to 4 weight percent of a film-forming acrylic resin having an average molecular weight of from about 235,000 to about 285,000; 4 to 8 weight percent of a film-forming acrylic resin having an average molecular weight of from about 175,000 to about 225,000; 1 to 3 weight percent of solid caustic; and 75 to 85 weight percent water. The film-forming acrylic resins may be copolymers of alpha-beta ethylenically unsaturated carboxylic acid monomers and ethylenically unsaturated esters. A dried coating of the composition is water-soluble. A method for making the coating composition includes heating water from about 140 to about 200° F.; admixing to the heated water the solid caustic; admixing to the heated water the first and second film-forming acrylic resins; mixing the acrylic resin/caustic/water mixture until the acrylic resins are dissolved in the water; and admixing additional water into the acrylic resin/caustic/water mixture in an amount so that the total water in the composition is from about 75 to about 85 weight percent. The composition may be applied to any article, such as an automobile body having partially-set paint thereon to protect the paint from scratching.

6 Claims, No Drawings

METHOD FOR PROTECTING PAINT ON AN ARTICLE, A COMPOSITION USEFUL THEREFOR, AND A METHOD FOR MAKING THE COMPOSITION

This application is a continuation-in-part of U.S. application Ser. No. 09/508,126 filed Mar. 6, 2000, now U.S. Pat. No. 6,391,961.

BACKGROUND OF THE INVENTION

1. Field of the Invention

The present invention relates generally to a method for protecting paint on an article, a coating composition useful therefor, and a method for making the coating composition. More particularly, the present invention relates to (a) a method for protecting partially-set paint on an automobile or other body by coating the freshly-painted surfaces with a coating composition, (b) a water-based coating composition useful therefor, and (c) a method for making the water-based coating composition.

2. Description of the Related Art

In the manufacture of painted articles, a problem arises when the article is moved within the manufacturing plaint soon after painting. Transfer devices can easily mar a freshly painted surface if the paint is not completely set and/or cured prior to movement. Manufactures are currently looking for ways to protect these freshly painted surfaces. Needless to say, it may be advantageous to move a freshly painted article from one workstation to another before the paint is set in order to keep the factory moving.

One of the biggest problems encountered in the automotive industry is the scratching of the paint before delivery of an automobile to the final customer. It is a documented fact that there are more complaints about scratches on automobiles than about any other defect. It appears that a customer will take delivery from an automobile dealer on a vehicle that contains obviously defective parts or unsecured pieces, rather than take delivery on a vehicle that has paint scratches on the surface. Upon survey, the customers have stated that they believe that an unsecured part will likely be fixed by the dealer after delivery, but, since a scratch could have been easily caused by the new owner after it leaves the dealer, it would not be likely that a dealer would repair a scratch after the automobile leaves the dealer. Consequently, it is a significant problem for automobile dealers to deliver automobiles with impeccable finishes without any scratches.

Many of the scratches on an automobile body are caused during manufacture of the automobile. During its manufacture, an automobile body is painted and then heated or baked to partially set the paint. The partially-set paint is often referred to as "green" paint. The automobile body with "green" paint is then transferred to various areas of the assembly line to add trim to the automobile body. During movement of the automobile body and the trimming process, the automobile body is highly susceptible to scratching due to the softness of the paint and the amount of activity happening around the automobile body. It is therefore desirable to have a way of reducing or eliminating the scratching that occurs to "green" paint on an automobile body. It is also desirable that any method of reducing the occurrence of scratching would not harm or change the appearance of the paint in any way.

Therefore, the present invention seeks to provide a method for protecting fresh paint on an automobile body from scratching, which method is not harmful to the paint, is easy to perform, and is generally safe to perform. It would be especially useful if the coating is easily removable by washing with water. The present invention also seeks to provide a coating composition useful for the protecting method, and a method for making the coating composition.

The present invention also seeks to provide compositions and methods for protecting any painted surface from physical contact, chemical interactions or the outer-elements.

SUMMARY OF THE INVENTION

In accordance with the present invention, a coating composition is disclosed which is for protecting paint, and especially for temporarily protecting a partially-set coating of paint on an automobile body. The composition includes from about 1.5 to about 4 weight percent of a first film-forming acrylic resin having an average molecular weight of from about 235,000 to about 285,000; from about 4 to about 8 weight percent of a second film-forming acrylic resin having an average molecular weight of from about 175,000 to about 225,000; from about 1 to about 3 weight percent of sodium hydroxide and/or potassium hydroxide; and from about 75 to about 85 weight percent water. All weight percents discussed herein are based on the total weight of the composition.

The first and second acrylic resins may be copolymers of alpha-beta ethylenically unsaturated carboxylic acid monomers and ethylenically unsaturated esters. More specifically, the first and second acrylic resins may be poly(ethyl acrylate/methyl methacrylate/acrylic acid) copolymers.

The composition may further include from about 0.25 to about 2 weight percent of a chelating agent; from about 2 to about 5 weight percent of a plasticizer for the first and second acrylic resins; from about 0.25 to about 1 weight percent of a surface wetting agent; and a viscosity controller in an amount which controls the viscosity of the composition in the preferred range of from about 100 to about 500 centipoise. Preferably, the composition has a pH of from about 7.5 to about 9.0.

Another embodiment of the present invention is a method for making the above-described coating composition. The preferred method includes heating water from about 140 to about 200° F.; admixing sodium or potassium hydroxide, to the heated water; admixing to the heated water the first and second film-forming acrylic resins; mixing the acrylic resin/caustic/water mixture until the acrylic resins are dissolved in the water; and admixing additional water into the acrylic resin/caustic/water mixture in an amount so that the total water in the composition is from about 75 to about 85 weight percent.

Yet another embodiment of the present invention is a method for temporarily protecting a partially-set coating of paint on an article, such as an automobile body, from scratches. This method includes coating, onto the partially-set paint, a composition which forms a removable coating. Preferably, the removable coating is a water-soluble coating and is removable by washing with water. The method for temporarily protecting a partially-set coating of paint may, then, further include the step of removing the coating by washing with water.

Advantages of the present invention not described herein will be readily appreciated as the same becomes better understood after reading the subsequent description of the preferred embodiments.

DESCRIPTION OF THE PREFERRED EMBODIMENT(S)

One embodiment of the present invention is a method for protecting a coating of paint on an nitride such as an automobile body, from scratches. The method generally entails applying, onto the paint, a coating composition which forms, preferably, a removable coating on the automobile body.

A particularly suitable coating composition is one which forms a water-soluble coating which is removable by washing with water. One such coating composition, which is another embodiment of the present invention, generally includes a blend of two film-forming acrylic resins, caustic, and water. A blend of two film-forming acrylic resins has been found to yield the desired level of hardness for the resulting coating. In the following description of the coating composition and the method for making the coating composition, both of the present invention, all weight percents are based on the total weight of the coating composition.

One of the film-forming acrylic resins has an average molecular weight of from about 235,000 to about 285,000, preferably, from about 250,000 to about 270,000. The other film-forming acrylic resin has an average molecular weight of from about 175,000 to about 225,000, preferably, from about 190,000 to about 210,000. The film-forming acrylic resins may be copolymers of alpha-beta ethylenically unsaturated carboxylic acid monomers and ethylenically unsaturated esters.

Suitable alpha-beta ethylenically unsaturated carboxylic acid monomers for forming part of the film-forming acrylic resins include acrylic acid, methacrylic acid, ethacrylic acid, itaconic acid, maleic acid, fumaric acid, monoesters of dicarboxylic acids such as methyl hydrogen maleate, methyl hydrogen fumarate and ethylhydrogen fumarate and the chemically-equivalent acid anhydrides such as maleic anhydride. Acrylic acid and methacrylic acids are especially preferred as the alpha-beta ethylenically unsaturated carboxylic acid portion of the acrylic resins.

Suitable ethylenically unsaturated esters for forming part of the film-forming acrylic resins are those which are derived from an alpha-beta ethylenically unsaturated carboxylic acid and a lower alkanol. The alpha-beta ethylenically unsaturated carboxylic acids may be those that are described immediately hereinabove. The lower alkanols useful for forming the esters include the monoalkanols of from 1 to about 20 carbon atoms such as methanol, ethanol, propanol, isopropanol, n-butanol, sec-butanol, t-butanol, pentanol, hexanol, 2-ethylhexanol, heptanol, octanol, nonanol, decanol, and the like. Some specific ethylenically unsaturated esters which can be interpolymerized with ethylenically unsaturated acids include methyl acrylate, ethyl acrylate, butyl acrylate, 2-ethylhexyl acrylate, decyl methacrylate, stearyl acrylate, isopropylacrylate and cyclohexylmethacrylate. Ethyl acrylate, methyl acrylate, and methylmethacrylate are especially preferred. Especially preferred acrylic resins are poly(ethyl acrylate/methyl methacrylate/acrylic acid) copolymers.

Copolymerization of the foregoing monomers can be carried out in accordance with any of the techniques heretofore known or employed. The relative amounts of ethylenically unsaturated ester and ethylenically unsaturated carboxylic acid which are copolymerized to provide the interpolymers herein can vary over wide limits provided the interpolymer will possess sufficient carboxylic acid groups that subsequent neutralization of a part or all of these groups will provide a water-soluble resin. The capability generally corresponds to an interpolymer having an acid number between about 60 and about 110.

Specific film-forming acrylic resins which are suitable for the present invention include "CARBOSET" 525 and "CARBOSET" 526, both available from the B.F. Goodrich Chemical Company, Cleveland, Ohio, owner of the trademark "CARBOSET". "CARBOSET" 525 is poly(ethylacrylate/methyl methacrylate/acrylic acid) having the relative molar ratio of 56/37/7, an average molecular weight of about 260,000, a $T_g$ of about 37° C., and an acid number of about 80. "CARBOSET" 526 is a poly(ethylacrylate/methylmethacrylate/acrylic acid) having the relative molar ratio of 17/71/12, an average molecular weight of about 200,000, a $T_g$ of about 70° C., and an acid number of about 100.

The acrylic resin having the average molecular weight of from about 235,000 to about 285,000 is preferably employed in the coating composition in an amount of from about 1.5 to 4 weight percent, more preferably, from about 2 to about 3 weight percent, and, most preferably, about 2.25 weight percent. The acrylic resin having the average molecular weight of from about 175,000 to about 225,000 is preferably employed in the coating composition in an amount of from about 4 to about 8 weight percent, more preferably, from about 4 to about 5 weight percent, and, most preferably, about 4.7 weight percent.

The caustic employed in the coating composition of the present invention may be either sodium hydroxide, potassium hydroxide, or mixtures thereof. Preferably, the caustic is in solid, substantially pure, powder form. The caustic preferably serves to at least substantially neutralize the composition so that the composition does not harm the painted surfaces and render the acrylic resins soluble in water thus forming a more stable solution. The term "substantially neutralize" is used to mean that at least about 80% of the carboxylic acid groups of the acrylic resins are neutralized, thereby forming sodium or potassium acrylate, depending on which type of caustic is employed. Although other basic materials may serve to neutralize the composition, sodium and potassium hydroxides allow the coating formed by the coating composition to remain water-soluble. The caustic is preferably employed in the coating composition so that the coating composition has a pH of from about 7.5 to about 9.0, more preferably, from about 8.5 to 8.9. If the pH reaches higher than about 9.0, the coating composition is susceptible to harming the paint of the painted surfaces. Typically, the caustic is used in an amount from about 1 to about 3 weight percent and, more typically, from about 1 to about 2 weight percent, and, most typically, about 1.7 weight percent.

Water is used in the coating composition of the present invention in an amount which gives the composition a viscosity which is easily processed and easily coated onto the automobile body without sagging or running. Desirable viscosities are from about 100 to about 500 centipoise. Preferably, purified water, e.g., water which is purified by distillation, is used. Typically, water is used in an amount of from about 75 to about 85 weight percent, most preferably, about 81 weight percent.

Other ingredients are useful in the coating composition of the present invention, namely, chelating agents, plasticizers, surface wetting agents, Uv stabilizers, and viscosity controllers. Chelating agents are useful for improving the shelf life of the coating composition, i.e., reducing the amount of sediment created during storage. Exemplary chelating agents include ethylene diamine tetraacetic acid, its salts, and similar acids and their salts. Preferably, a chelating agent is employed in the coating composition in an amount of from about 0.25 to about 2 weight percent.

Plasticizers included in the coating composition of the present invention are present to plasticize the acrylic resins.

The plasticizer reduces the peeling, chipping, or cracking of the coating formed by the coating composition because it plasticizes the film-forming resins. Because of the reduction in peeling, chipping, and cracking, coatings formed by the coating composition have better adherence to the painted surface.

A suitable plasticizer for the aforementioned film-forming acrylic resins are acrylic resins having lower molecular weights, such as those having average molecular weights of from about 5000 to about 10,000. One such plasticizer is "CARBOSET" 515, available from the B. F. Goodrich Chemical Company. "CARBOSET" 515 is an acrylic resin having an average molecular weight of about 7000, a viscosity of about 2,000,000 cP, a $T_g$ of about −14° C., and an acid number of from about 60 to about 65.

The plasticizer is preferably employed in the coating composition in an amount of from about 2 to about 5 weight percent, more preferably, from about 3 to about 4 weight percent, and most preferably, about 3.75 weight percent.

Surface wetting agents in the coating composition improves the spreading of the coating composition on the painted automobile body surfaces. Any of many surface wetting agents may be employed. A preferred surface wetting agent is "STEOL" CA460, an ammonium laureth sulfate available from the Stepen Company, Northfield, Ill. Preferably, a surface wetting agent is employed in the coating composition in an amount of from about 0.25 to about 1 weight percent.

Viscosity controllers are additives which help to control the viscosity of the coating composition. A suitable viscosity is important for processing the coating composition and for ease of application. By varying the type and amount of the viscosity controller as well as the amount of water in the coating composition, the coating composition may be made to have a desirable viscosity which is preferably from about 100 to about 500 centipoise and, more preferably, from about 130 to about 170 centipoise.

Suitable viscosity controllers include non-film-forming acrylic copolymers which have a significantly lower average molecular weight than the film-forming acrylic resins. Preferred average molecular weights are from about 2000 to about 10000. For example, the acrylic-styrene copolymers "CARBOSET" GA-1161 and 1162, both available from the B. F. Goodrich Chemical Company, are suitable viscosity controllers for the coating composition. "CARBOSET" GA-1161 is poly(styrene/alpha-methylstyrene/butylacrylate/acrylic acid) having a molar ratio of 23/23/21/33, an average molecular weight of about 3500 and an acid number of about 190. A viscosity controller is preferably employed in the coating composition in an amount of from about 5 to about 7 weight percent, more preferably, from about 5.5 to about 6.5 weight percent, and, most preferably, about 6 weight percent.

The coating composition of the present invention may generally be made by heating a major portion of the water, admixing the caustic and the film-forming acrylic resins into the preheated water, mixing until the film-forming acrylic resins are dissolved in the water, and, optionally, adding additional water after the film-forming acrylic resins are dissolved. It is preferred that other ingredients, such as the chelating agent, the plasticizer, the surface wetting agent, and the viscosity controller be admixed into the mixture. The following description of a method for making the coating composition is a preferred method of the present invention. The following procedure was developed to reduce or eliminate the occurrence of undesirable gelling of the coating composition.

To begin the method of making the coating composition, a major portion of the water needed for the composition is heated. The amount of water heated may be from about 60 to 100 percent of the amount of water that is desired in the final coating composition. Preferably, about 70 percent of the water is heated, so that some water is reserved to be added as a final preparation step to assist in the cooling of the composition.

The water is heated to a temperature of from about 140 to about 200° F., preferably from about 160 to about 180° F. It is advantageous to next admix any chelating agent and the solid caustic to the heated water. The addition of the caustic typically raises the temperature of the water, e.g., about 10° F.

Next, the viscosity controller is added to the mixture and allowed to dissolve while agitating the mixture. Thereafter, one of the film-forming acrylic resins is admixed to the heated mixture, and the mixture is continued to be mixed for a period of time, typically, about one hour or until the film-forming acrylic resin is dissolved in the water.

The other film-forming acrylic resin is then admixed to the heated mixture, and the mixing is continued until the resin is dissolved in the water. Thereafter, the mixture is allowed to cool to about 150° F., and the plasticizer, which has been heated to reduce its viscosity, is admixed to the mixture. The mixing is then continued for about 10 to 20 minutes.

Once the plasticizer has been thoroughly blended into the mixture, the remaining water needed for the desired composition is added to the mixture. Additional water may need to be added to replenish any water that has been lost by evaporation.

Finally, the surface wetting agent is admixed into the mixture. The mixture may then be tested for viscosity and pH, and the mixture composition may be adjusted so that the mixture has the desired properties. For example, water may be added if the composition is too viscous and caustic may be added if the composition is too acidic. After 24 hours of storage of the composition, it is recommended to retest the viscosity and the pH of the coating composition and adjust the composition as necessary.

To use the coating composition of the present invention, the composition need merely be applied to any desired article, such as an automobile body, the article having a partially-set coating of paint thereon. The application of the coating composition may be done by, e.g., brushing, sponging, or spraying. Typically, it is useful to allow the coating composition to dry for a few minutes before moving to the next station. The dried coating is preferably about two to four millimeters thick. The partially-set paint, having the coating thereon, is thereby temporarily protected from scratches.

The coating formed from the composition of the present invention may be removed by washing with water. In many automobile manufacturing processes, the automobiles are subjected to a leak test in which water is sprayed over the car. The leak test or a regular car wash will most likely be sufficient washing to remove the temporary protective coating.

The industrial applicability of the present invention includes using the coating composition in the method described to protect freshly-painted automobile bodies from being scratched or similarly damaged in automobile manufacturing plants. The method of making the coating composition provides a coatings manufacturer to make the coating composition for the automobile industry.

The following example is illustrative only and should not be construed as limiting the invention which is properly delineated in the appended claims. In the following example, the "CARBOSETS" are as described hereinabove.

EXAMPLE 1582 pounds of distilled water were heated in an open-atmosphere insulated tank over gas burners until the temperature of the water reached about 180° F. Once the water reached about 180° F., the gas burners were turned off. 8 pounds of sodium ethylene diamine tetraacetate (sodium EDTA) were then added to the water, and the EDTA/water mixture was strongly agitated with dual-propeller mixers. Then about 45 pounds of dry, free-flowing granulated sodium hydroxide were added to the agitating water mixture, and the temperature of the mixture rose to about 190° F. Then 167.4 pounds of "CARBOSET" GA-1161 polymer were added as a viscosity controller to the agitating mixture and mixing continued for about 15 minutes to allow the viscosity controller to dissolve.

Next, 131 pounds of "CARBOSET" 526 polymer were added into the agitating mixture and the agitation was continued for about one hour to solubilize the "CARBOSET" 526 polymer. Thereafter, 63 pounds of "CARBOSET" 525 polymer were added into the agitating mixture and the agitation was continued for about one hour to dissolve the "CARBOSET" 525 polymer.

Then, about 105 pounds of "CARBOSET" 515, which had been heated to about 170 to 180° F., were added to the agitating mixture. The mixture was agitated for between 10 and 20 minutes longer to allow the "CARBOSET" 515 polymer to blend into the mixture thoroughly.

Next, 678 pounds of distilled water were added to maintain the desired level of water in the coating composition, and the mixture was agitated for another five to ten minutes. Then, about 8 pounds of "STEOL" CA460 ammonium laureth sulfate surface wetting agent were added to the agitating mixture.

When the temperature of the mixture was cooled to at least about 120° F., the mixture was filtered and loaded into drums. The method yielded six drum batches, each weighing about 465 pounds.

INDUSTRIAL APPLICABILITY

This invention is useful as an anti-scratch coating for use on the painted surfaces of automobiles, marine applications, appliances and the like to prevent scratching during shipping. Shipping of such articles usually involves placement on transport trucks, and small rocks in the air scratch the freshly painted surfaces.

What is claimed is:

1. A method for protecting a coating of paint on an article, including an automobile body, from scratches, the method comprising coating onto the paint a protective composition which comprises a water-washable combination of acrylic resins, water, and a caustic, wherein the composition forms a water-washable coating and is removed from the article by washing with only water, the method further comprising removing the water-washable coating by rinsing with only water.

2. A coating composition for protecting a coating of paint, the composition comprising:
   from about 5.5 to about 12 weight percent of at least one film-forming acrylic resin;
   from about 5 to about 12 weight percent of a combination acrylic resin which functions both as a viscosity controller and a plasticizer;
   from about 1 to about 3 weight percent of a caustic selected from the group consisting of sodium hydroxide, potassium hydroxide, and mixtures thereof so that the composition has a pH of from about 7.5 to about 9.0; and
   from about 73 to about 88.5 weight percent water, all weight percents being based on the total weight of the composition,
   whereby the resultant composition has an acid number between about 60 and about 110, and the combination of the resins with the caustic results in a water-washable coating composition that is removed by rinsing with water.

3. The coating composition of claim 2, wherein said acrylic resin functioning as a viscosity controller is present in an amount which controls the viscosity of the composition in the range of from about 100 to about 500 centipoise.

4. A coating composition for protecting a coating of paint, the composition comprising:
   from about 4 to about 8 weight percent of a first film-forming acrylic resin having an average molecular weight of from about 200,000 to about 260,000;
   from about 5 to about 7 weight percent of a second acrylic resin having a weight average molecular weight of from about 2,000 to about 10,000;
   from about 1 to about 3 weight percent of a caustic selected from the group consisting of sodium hydroxide, potassium hydroxide, and mixtures thereof so that the composition has a pH of from about 7.5 to about 9.0;
   a viscosity controller in an amount which controls the viscosity of the composition in the range of from about 100 to about 500 centipoise; and
   from about 82 to about 90 weight percent water, all weight percents being based on the total weight of the composition,
   whereby the resultant composition has an acid number between about 60 and about 110, and the combination of the resins with the caustic results in a water-washable coating composition that is removed by rinsing with water.

5. A method for protecting a coating of paint, comprising:
   coating onto the paint a protective water-only washable composition including,
   from about 5.5 to about 12 weight percent of at least one film-forming acrylic resin;
   from about 5 to about 12 weight percent of a combination acrylic resin which functions both as a viscosity controller and a plasticizer;
   from about 1 to about 3 weight percent of a caustic selected from the group consisting of sodium hydroxide, potassium hydroxide, and mixtures thereof so that the composition has a pH of from about 7.5 to about 9.0; and
   from about 73 to about 88.5 weight percent water, all weight percents being based on the total weight of the composition,
   whereby the resultant coated composition has an acid number between about 60 and about 110, and the combination of the resins with the caustic results in a water-washable coating composition; and
   rinsing with only water to remove the water-only washable protective coating.

6. A method for protecting a coating of paint, comprising:

coating onto the paint a protective water-only washable composition including, from about 4 to about 8 weight percent of a first film-forming acrylic resin having an average molecular weight of from about 200,000 to about 260,000;

from about 5 to about 7 weight percent of a second acrylic resin having a weight average molecular weight of from about 2,000 to about 10,000;

from about 1 to about 3 weight percent of a caustic selected from the group consisting of sodium hydroxide, potassium hydroxide, and mixtures thereof so that the composition has a pH of from about 7.5 to about 9.0;

a viscosity controller in an amount which controls the viscosity of the composition in the range of from about 100 to about 500 centipoise; and from about 82 to about 90 weight percent water, all weight percents being based on the total weight of the composition, whereby the resultant coated composition has an acid number between about 60 and about 110, and the combination of the resins with the caustic results in a water-washable coating composition; and rinsing with only water to remove the water-only washable protective coating.

* * * * *